United States Patent
Sato

(10) Patent No.: US 9,245,234 B2
(45) Date of Patent: Jan. 26, 2016

(54) RECOGNITION DICTIONARY GENERATING DEVICE AND PATTERN RECOGNITION DEVICE

(75) Inventor: Atsushi Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 387 days.

(21) Appl. No.: 13/978,566

(22) PCT Filed: Dec. 28, 2011

(86) PCT No.: PCT/JP2011/007342
§ 371 (c)(1),
(2), (4) Date: Jul. 8, 2013

(87) PCT Pub. No.: WO2012/095938
PCT Pub. Date: Jul. 19, 2012

(65) Prior Publication Data
US 2013/0290228 A1   Oct. 31, 2013

(30) Foreign Application Priority Data

Jan. 11, 2011  (JP) .................................. 2011-002728

(51) Int. Cl.
*G06N 99/00* (2010.01)
*G10L 15/06* (2013.01)
*G06K 9/62* (2006.01)

(52) U.S. Cl.
CPC ............ *G06N 99/005* (2013.01); *G06K 9/6255* (2013.01); *G06K 9/6271* (2013.01); *G10L 15/063* (2013.01)

(58) Field of Classification Search
None
See application file for complete search history.

(56) References Cited

FOREIGN PATENT DOCUMENTS

| JP | 7-49951 A | 2/1995 |
|---|---|---|
| JP | 7-225837 A | 8/1995 |
| JP | 9-6745 A | 1/1997 |
| JP | 3452160 B2 | 7/2003 |

OTHER PUBLICATIONS

A. Sato & K. Yamada, "Generalized Learning Vector Quantization," Advances in Neural Information Processing Systems, vol. 8, pp. 423-429, MIT Press, 1996.

(Continued)

*Primary Examiner* — Jeffrey A Gaffin
*Assistant Examiner* — Nathan Brown, Jr.

(57) ABSTRACT

A recognition dictionary generating device includes a unit that acquires plural reference vectors each containing an offset value indicating a degree of importance; a unit that selects a first reference vector belonging to the class same as an input vector and having the minimum distance from the input vector, and a second reference vector belonging to a class different from the input vector and having the minimum distance from the input vector; a unit that acquires a first distance value indicating a distance between the input vector and the first reference vector and a second distance value indicating a distance between the input vector and the second reference vector; a unit that corrects the first reference vector and the second reference vector using a coefficient changing in accordance with a relationship between the first distance value and the second distance value, the first distance value, and the second distance value; and a determining unit that determines a reference vector to be excluded from a recognition dictionary in accordance with the offset value of the corrected first reference vector and second reference vector.

10 Claims, 9 Drawing Sheets

(56) References Cited

OTHER PUBLICATIONS

Ryuta Ito et al., "Competitive Models for Unsupervised Clustering", The Transactions of the Institute of Electronics, Information and Communication Engineers, Aug. 25, 1996, No. 8, pp. 1390-1400. Concise English language explanation.

Hideya Yoshiuchi, et al., "Pattern Recognition Method for Metric Space by Four Points Embedding", IEICE Technical Report, The Institute of Electronics, Information and Communication Engineers, Jun. 18, 1998, vol. 98, No. 26, pp. 25-32. Concise English language explanation.

International Search Report for PCT Application No. PCT/JP2011/007342 mailed on Feb. 21, 2012.

RECOGNITION DICTIONARY GENERATING DEVICE AND PATTERN RECOGNITION DEVICE

This application is a National Stage Entry of PCT/JP2011/007342 filed Dec. 28, 2011, which claims priority from Japanese Patent Application 2011-002728 filed Jan. 11, 2011, the contents of all of which are incorporated herein by reference, in their entirety.

TECHNICAL FIELD

The present invention relates to a pattern recognition technique.

BACKGROUND ART

Currently, pattern recognition techniques have been used in various fields such as individual authentication, facial expression recognition, speech recognition, and character recognition. In general, pattern recognition is performed by extracting feature vectors from input patterns, and checking the extracted feature vector against recognition dictionary prepared in advance, thereby judging as to which category the input pattern belongs to.

Non-patent Document 1 described below proposes a pattern recognition device that calculates a distance between plural reference vectors called recognition dictionaries and input vectors representing input patterns with vectors, and on the basis of the calculation results, takes a class of reference vector having the minimum distance from the input vector as a recognition result of the input vector. At the time of learning the reference vectors, this pattern recognition device uses a gradient method to correct values of the reference vectors such that values of an evaluation function, which represents errors of learning data, decrease.

Further, Patent Document 1 described below proposes a method of learning reference vectors as described below. A first reference vector represents a reference vector having the minimum distance from the input vector of all the reference vectors belonging to the same class as the input vector. A second reference vector represents a reference vector having the minimum distance from the input vector of all reference vectors belonging to a class different from the class to which the input vector belongs. The first reference vector and the second reference vector are corrected using a value obtained through exponentiation conversion applied to a distance between an input vector and the first reference vector and a value obtained through exponentiation conversion applied to a distance between the input vector and the second reference vector.

RELATED DOCUMENT

Patent Document

Patent Document 1: Japanese Patent No. 3452160

Non-Patent Document

Non-patent Document 1: A. Sato & K. Yamada, "Generalized Learning Vector Quantization," Advances in Neural Information Processing Systems, Vol. 8, pp. 423-429, MIT Press, 1996.

SUMMARY OF THE INVENTION

During the learning of the recognition dictionary as described above, a feature extracting unit converts the inputted data into d-dimensional feature vector (d is an integer not less than 1), and corrects the reference vector using this feature vector. At this time, the reference vector correcting unit uses an attraction force and a repulsion force from the feature vector to move the position of the reference vector within a space of the d-dimensional feature vector, thereby correcting the reference vector so as to reduce the error ratio of learning data.

However, the recognition dictionary may contain the large number of reference vectors that do not have any effect on the recognition accuracy. With the above-described method, processing is performed for all the reference vector including such a redundant reference vector, and thus, a great deal of time has to be spent for the pattern recognition process.

An object of the present invention is to provide a technique that increases the speed of the pattern recognition process without deteriorating the recognition accuracy.

Each aspect of the present invention employs the following configurations to solve the problems described above.

A first aspect of the present invention relates to a recognition dictionary generating device that generates a recognition dictionary formed by plural reference vectors. The recognition dictionary generating device according to the first aspect includes: an acquiring unit that acquires plural (d+1)-dimensional reference vectors (d is an integer not less than 1) each containing d pieces of feature values and an offset value indicating a degree of importance of each of the reference vectors, and a (d+1)-dimensional learning input vector; a selection unit that, from among the plural reference vectors acquired by the acquiring unit, selects a first reference vector belonging to the class same as the learning input vector and having the minimum distance from the learning input vector, and a second reference vector belonging to a class different from the learning input vector and having the minimum distance from the learning input vector; a distance acquiring unit that acquires a first distance value indicating a distance between the learning input vector and the first reference vector, and a second distance value indicating a distance between the learning input vector and the second reference vector; a correcting unit that corrects the first reference vector using a first correction vector obtained by multiplying a coefficient changing in accordance with a relationship between the first distance value and the second distance value, by a value obtained by exponentiation of the second distance value, and by a difference between the learning input vector and the first reference vector, and corrects the second reference vector using a second correction vector obtained by multiplying the coefficient, by a value obtained by exponentiation of the first distance value, and by a difference between the learning input vector and the second reference vector; and a determining unit that determines a reference vector to be excluded from the recognition dictionary in accordance with an offset value of each of the first reference vector and the second reference vector, each of which has been corrected by the correcting unit.

A second aspect of the present invention relates to a recognition dictionary generating method that generates a recognition dictionary formed by plural reference vectors. The recognition dictionary generating method according to the second aspect causes a computer to: acquire plural (d+1)-dimensional reference vectors (d is an integer not less than 1) each containing d pieces of feature values and an offset value indicating a degree of importance of each of the reference vectors, and a (d+1)-dimensional learning input vector; select, from among the acquired plural reference vectors, a first reference vector belonging to the class same as the learning input vector and having the minimum distance from the learning input vector, and a second reference vector belonging to a class different from the learning input vector and having the minimum distance from the learning input vector; acquire a first distance value indicating a distance between the learning input vector and the first reference vector and a second distance value indicating a distance between the learning input vector and the second reference vector; correct the first reference vector using a first correction vector obtained by multiplying a coefficient changing in accordance with a relationship between the first distance value and the second distance value, by a value obtained by exponentiation of the second distance value, and by a difference between the learning input vector and the first reference vector; correct the second reference vector using a second correction vector obtained by multiplying the coefficient, by a value obtained by exponentiation of the first distance value, and by a difference between the learning input vector and the second reference vector; and determine a reference vector to be excluded from the recognition dictionary in accordance with the offset value of each of the first reference vector and the second reference vector, each of which has been corrected.

A third aspect of the present invention relates to a pattern recognition device including: the recognition dictionary generating device according to the first aspect; a first conversion unit that converts a feature vector containing d pieces of feature values acquired from input data, into a (d+1)-dimensional input vector; a recognition dictionary that is formed by the plural (d+1)-dimensional reference vectors except for the reference vector determined, by the determining unit according to the first aspect, to be excluded from the recognition dictionary; and a classifying unit that classifies a class to which the input data belongs by using the plural reference vectors constituting the recognition dictionary and the input vector obtained through conversion by the first conversion unit. Note that another aspect of the present invention may include a program that causes a computer to realize the configuration of the first aspect or the third aspect of the present invention, or may include a computer-readable storage medium storing such a program. This storage medium includes a non-transitory tangible media.

According to the aspects of the present invention described above, it is possible to provide the technique that increases the speed of the pattern recognition process without reducing the recognition accuracy.

DESCRIPTION OF EMBODIMENTS

Figure 1:
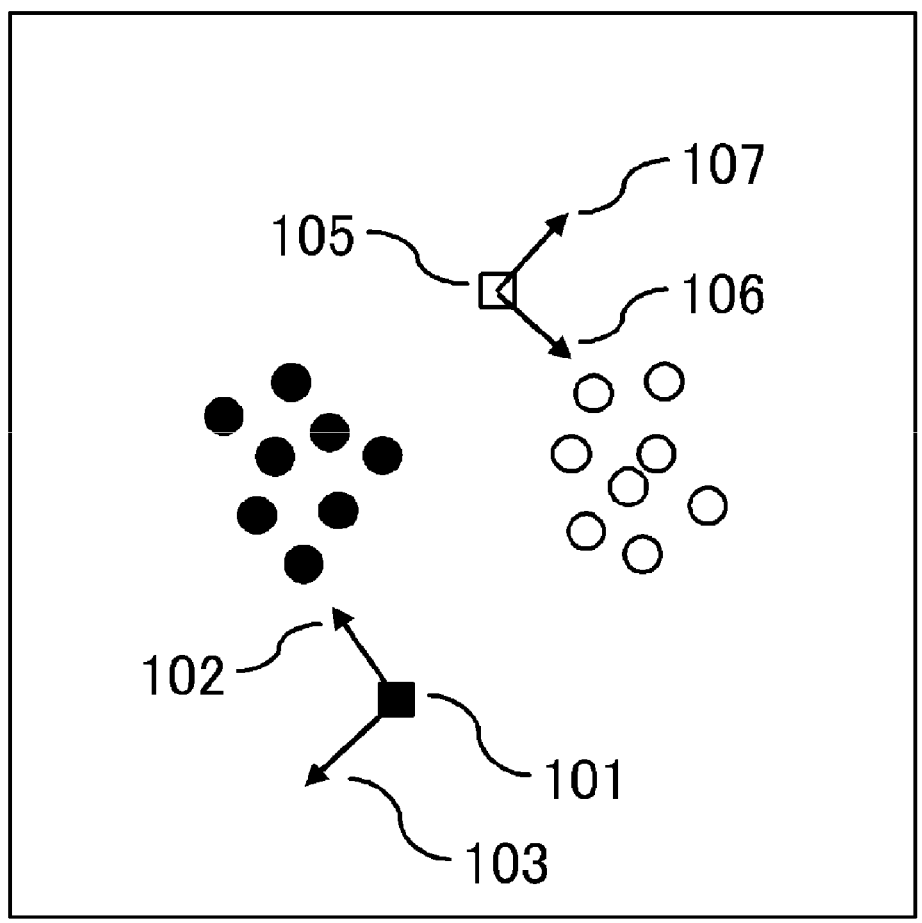
FIG. 1 is a diagram illustrating a concept of learning reference vectors.

Hereinbelow, embodiments according to the present invention will be described. Note that the exemplary embodiments described below are merely examples, and the present invention is not limited to the configurations of the following exemplary embodiments.

First Exemplary Embodiment

A recognition dictionary generating device according to this exemplary embodiment is a device that generates a recognition dictionary formed by plural reference vectors, and includes, for example, an acquiring unit, a selection unit, a distance acquiring unit, a correcting unit, and a determining unit. Each of the reference vectors is managed so as to belong to any one of plural classes.

The acquiring unit acquires plural reference vectors with (d+1) dimension (d is an integer not less than 1) each containing d pieces of feature values and an offset value indicating the degree of importance of each of the reference vectors, and a (d+1)-dimensional learning input vector.

The selection unit selects, from the plural reference vectors acquired by the acquiring unit, a first reference vector that belongs to the same class as the learning input vector and has the minimum distance from the learning input vector, and a second reference vector that belongs to a class different from that of the learning input vector and has the minimum distance from the learning input vector.

The distance acquiring unit acquires a first distance value indicating a distance between the learning input vector and the first reference vector, and a second distance value indicating a distance between the learning input vector and the second reference vector. This exemplary embodiment does not limit the method of calculating the distance between the vectors, and uses a Euclidean distance for example.

The correcting unit corrects the first reference vector and the second reference vector, each of which is selected by the selection unit. More specifically, the correcting unit calculates a first correction vector and a second correction vector, corrects the first reference vector using the first correction vector, and corrects the second reference vector using the second correction vector. The correcting unit calculates the first correction vector by multiplying a coefficient changing according to relationships between the first distance value and the second distance value, by a value obtained by exponentiation of the second distance value, and by a difference between the learning input vector and the first reference vector. The correcting unit calculates the second correction vector by multiplying the coefficient described above, by a value obtained by exponentiation of the first distance value, and by a difference between the learning input vector and the second reference vector.

The determining unit determines a reference vector to be excluded from the recognition dictionary in accordance with the offset values of the first reference vector and the second reference vector, each of which has been corrected by the correcting unit.

Below, the offset value indicating the degree of importance of the reference vector will be described. FIG. 1 is a diagram illustrating a concept of learning the reference vector.

In the example illustrated in FIG. 1, the input vector used in learning is two-dimensional (d=2) feature vector, and the blank circles represent positions of input vectors belonging to a positive class whereas the filled black dots represent positions of input vectors belonging to a negative class. Further, the black squares 101 represent reference vectors belonging to the class same as the black dots whereas the blank squares 105 represent reference vectors belonging to the class same as the blank circles.

At the time of generating the recognition dictionary, the reference vector 101 receives the attraction force 102 from the input vector (black dot) belonging to the same class, and receives the repulsion force 103 from the input vector (blank circle) belonging to the different class. This makes the positions of the reference vectors 101 corrected into the direction of the resultant force of the attraction force 102 and the repulsion force 103. In a similar manner, the reference vector 105 receives the attraction force 106 from the input vector (blank circle) belonging the same class, and receives the repulsion force 107 from the input vector (black dot) belonging to the different class. This makes the positions of the reference vectors 105 corrected into the direction of the resultant force of the attraction force 106 and the repulsion force 107.

Figure 2:
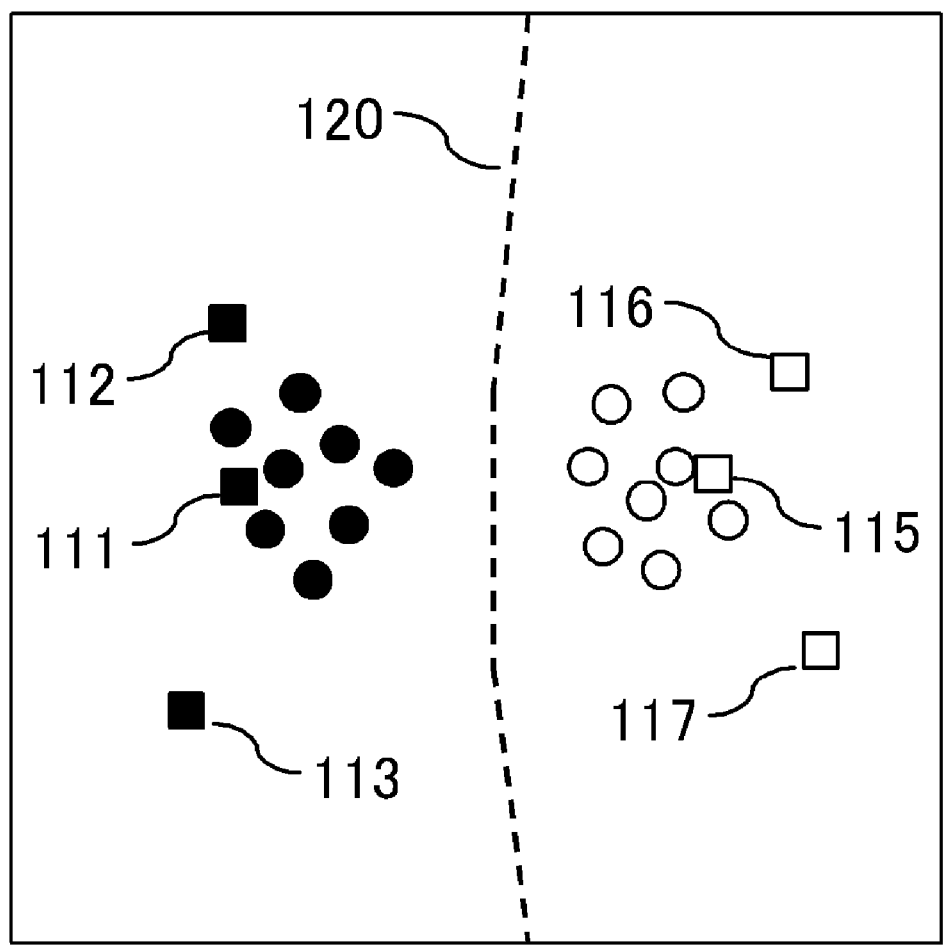
FIG. 2 is a diagram illustrating a concept of classifying input vectors using reference vectors.

FIG. 2 is a diagram schematically illustrating a concept of classifying the input vectors using the reference vectors. In the example illustrated in FIG. 2, three reference vectors exist in each of the positive class and the negative class. The black squares 111, 112, and 113 represent the reference vectors belonging to the negative class, and the blank squares 115, 116, and 117 represent the reference vectors belonging to the positive class. In this specification, the classifying function for each of the classes can be expressed by the following (Equation 1).

[Formula 1]

$$d_k(\vec{x}) = \min_{i=1}^{M_k} \|\vec{x} - \vec{y}_{ki}\|^2 \qquad \text{Equation 1}$$

In the Equation 1 described above, the vector x represents the input vector, the vector $y_{ki}$ represents the reference vector belonging to a class $\omega_k$, and $M_k$ represents the number of the reference vectors belonging to the class $\omega_k$. In the example illustrated in FIG. 2, $M_1$ and $M_2$ are 3. Further, the "min" represents a function for obtaining the minimum value concerning the variable i. With a classifying function $d_k(x)$ for the class $\omega_k$, it is possible to acquire the square of a Euclidean distance (hereinafter, referred to as a squared Euclidean distance) between a vector x and the reference vector closest to the vector x. The class $\omega_k$ having the minimum value of the classifying function $d_k(x)$ is obtained as the recognition result for the input vector x.

In the example illustrated in FIG. 2, when $\omega_1$ is the positive class and $\omega_2$ is the negative class, the boundary for classifying the class ($\omega_1$ or $\omega_2$) to which the input vector x belongs (hereinafter, referred to as a classifying boundary) is a group of vectors x having the $d_1(x)$ value and the $d_2(x)$ value equal to each other ($d_1(x)=d_2(x)$). In other words, the classifying boundary is defined as a plane equidistant from adjacent reference vectors belonging to different classes located next to each other. In FIG. 2, the classifying boundary between the positive class and the negative class is denoted as a reference character 120.

Here, in the example illustrated in FIG. 2, by setting the classifying boundary 120 so as to be a plane equidistant from the reference vector 115 belonging to the positive class and the reference vector 111 belonging to the negative class, it is possible to correctly classify all the samples (input vectors). In other words, the other reference vectors 112, 113, 116, and 117 have no effect on the recognition accuracy, and can be regarded as redundant reference vectors. In this exemplary embodiment, these redundant reference vectors are of less importance.

Figure 3:
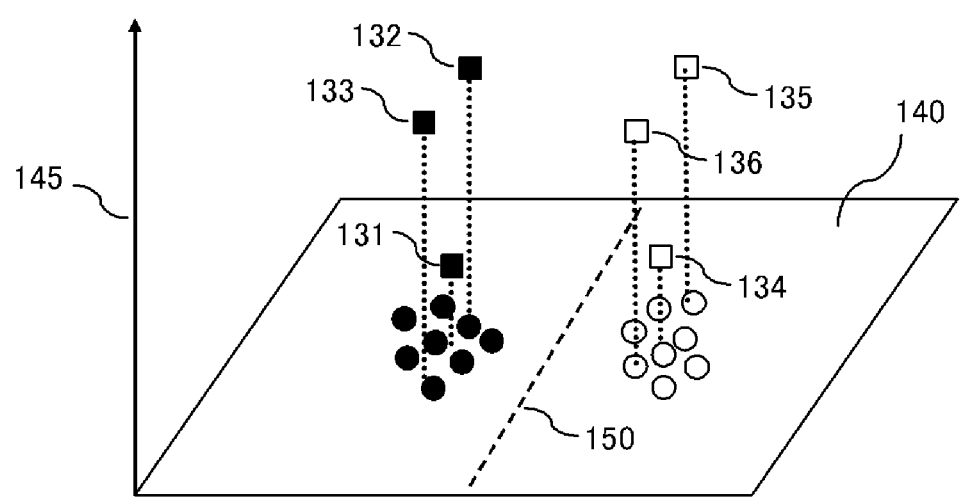
FIG. 3 is a diagram illustrating a concept of reference vectors and input vectors in an exemplary embodiment.

In this exemplary embodiment, an offset value indicating the degree of the importance as described above is set to each of the reference vectors. FIG. 3 is a diagram illustrating a concept of the reference vector and the input vector in this exemplary embodiment. In the example illustrated in FIG. 3, reference vectors 131, 132, 133, 134, 135, and 136 each indicated as blank squares or black squares are three-dimensional vectors each containing a two-dimensional feature value and an offset value. Further, input vectors indicated as blank circles or black dots are three-dimensional vectors obtained by adding an element (0) to the two-dimensional feature vectors.

Here, for each of the input vectors, the additional elements are zero, and hence, the input vectors exist on a two-dimensional plane 140. On the other hand, each of the reference vectors has the offset value, and hence, exists in the three-dimensional space in which an offset axis 145 is added to the two-dimensional plane 140. With the correction process performed by the correcting unit, the reference vectors receive the attraction force from the learning input vector belonging to the same class, and receive the repulsion force from the learning input vector belonging to the different class, thereby moving in the three-dimensional space as described above.

Here, the reference vectors 132, 133, 135, and 136 having the large offset values are located further from the input vector than the reference vectors 131 and 134 having the small offset value, and do not contribute to the formation of a classifying boundary 150. Thus, deleting those reference vectors has no effect on the recognition accuracy. In other words, the offset value indicates the importance of each of the reference vectors. With this configuration, the reference vectors having the large offset value are less important, and hence, can be excluded from the target to be stored as the recognition dictionary.

The concept illustrated in FIG. 3 can also be explained in the following manners. In this exemplary embodiment, to set the offset value, the classifying function can be expressed as the following Equation 2. The following Equation 2 is obtained by adding an offset value $\sigma_{ki}$ to the above-described Equation 1.

[Formula 2]

$$d_k(\vec{x}) = \min_{i=1}^{M_k} \left( \|\vec{x} - \vec{y}_{ki}\|^2 + \sigma_{ki}^2 \right) \qquad \text{Equation 2}$$

Here, by increasing the dimensions of the input vector and the reference vector by one dimension, and expressing the input vector and the reference vector as Equation 3-1 and Equation 3-2, the above-described Equation 2 can be expressed as the following Equation 4. The following Equation 4 has the same form as the above-described Equation 1.

[Formula 3]

$$\vec{X} = (\vec{x}, 0) \qquad \text{Equation 3-1}$$

-continued $$\vec{Y}_{ki} = (\vec{y}_{ki}, \sigma_{ki})$$ Equation 3-2

$$d_k(\vec{X}) = \min_{i=1}^{M_k}(\|\vec{X} - \vec{Y}_{ki}\|^2)$$ Equation 4

Operation and Effect of First Exemplary Embodiment

As described above, in this exemplary embodiment, the offset value is set to each of the reference vectors, and with learning (correcting) of each of the reference vectors, the offset value indicates the degree of importance of each of the reference vectors. Then, in accordance with the offset value, the reference vectors to be excluded from the recognition dictionary are determined.

Thus, according to this exemplary embodiment, by referring to the offset value of each of the reference vectors, it is possible to easily determine the redundant reference vector that is of less importance, in other words, that does not have any effect on the recognition accuracy. Further, it is possible to determine the reference vectors that should not be stored in the recognition dictionary. As a result, according to this exemplary embodiment, it is possible to perform the pattern recognition process only using the important reference vectors that have strong effect on the recognition accuracy, whereby it is possible to reduce the time required for the pattern recognition process without causing a deterioration in the recognition accuracy.

Second Exemplary Embodiment

Below, a second exemplary embodiment is an example obtained by embodying, in more detail, the configuration of the recognition dictionary generating device according to the first exemplary embodiment described above, and applying it to a pattern recognition device.

[Device Configuration]

Figure 4:
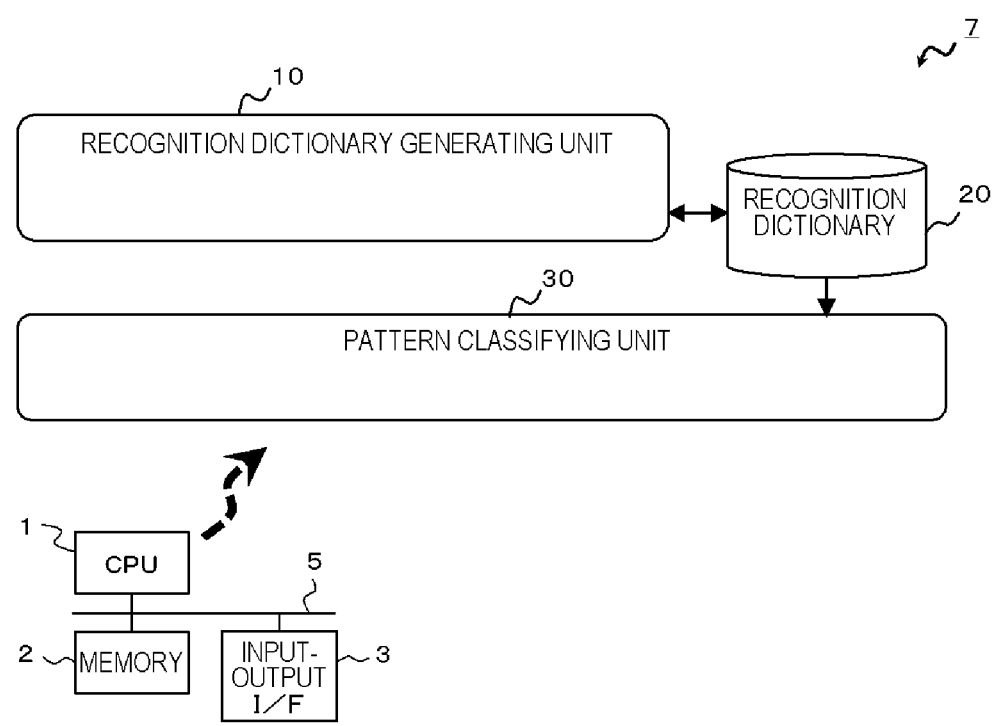
FIG. 4 is a schematic view illustrating an example of a configuration of a pattern recognition device according to a second exemplary embodiment.

FIG. 4 is a schematic view illustrating an example of a configuration of a pattern recognition device 7 according to the second exemplary embodiment. The pattern recognition device 7 includes, as a hardware configuration, a central processing unit (CPU) 1, a memory 2 (for example, a random access memory (RAM), a read only memory (ROM), a hard disk, and a portable storage device), and an input-output interface 3, for example. These hardware elements are connected to each other, for example, through a bus 5. Note that this exemplary embodiment does not limit the hardware configuration of the pattern recognition device 7.

The pattern recognition device 7 includes, as a software configuration, a recognition dictionary generating unit 10, a recognition dictionary 20, and a pattern classifying unit 30, for example. The recognition dictionary generating unit 10 and the pattern classifying unit 30 are realized, for example, with the CPU 1 running a program stored in the memory 2.

The recognition dictionary 20 is formed by plural reference vectors which are corrected by the recognition dictionary generating unit 10, and do not include the reference vectors that are of less importance. The recognition dictionary 20 is stored in the memory 2.

The pattern classifying unit 30 classifies a class (category) to which each input data belongs by using the reference vectors stored as the recognition dictionary 20.

The recognition dictionary generating unit 10 corresponds to the configuration of the recognition dictionary generating device according to the first exemplary embodiment. The recognition dictionary generating unit 10 acquires input vectors for learning and initialized reference vectors, corrects the reference vectors according to the learning input vector, and stores, as the recognition dictionary 20, the plural reference vectors other than the reference vectors having less importance.

Figure 5:
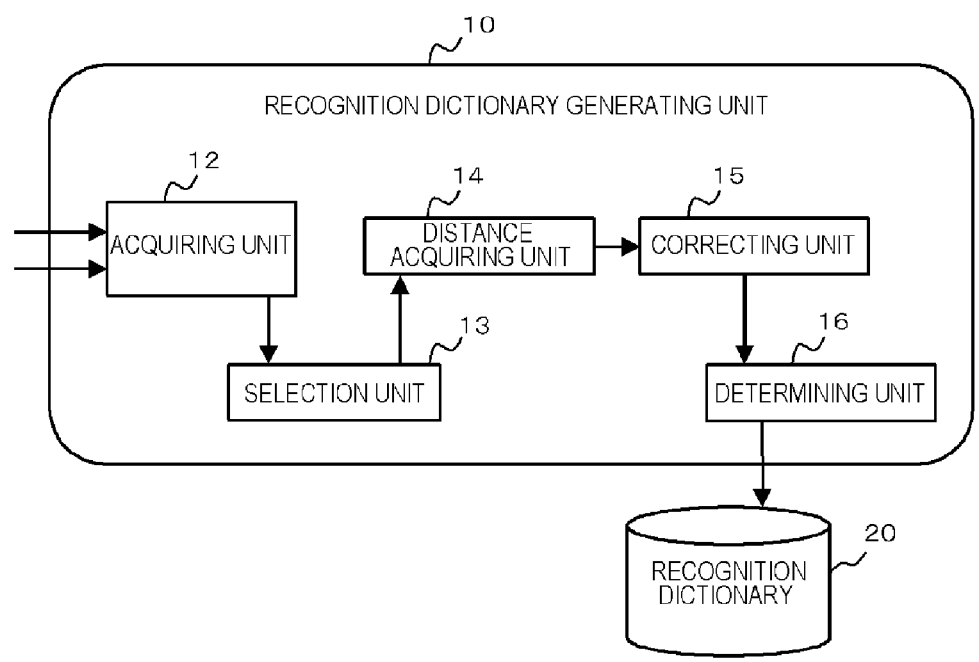
FIG. 5 is a schematic view illustrating an example of a configuration of a recognition dictionary generating unit.

FIG. 5 is a schematic view illustrating an example of a configuration of the recognition dictionary generating unit 10. The recognition dictionary generating unit 10 includes, for example, an acquiring unit 12, a selection unit 13, a distance acquiring unit 14, a correcting unit 15, and a determining unit 16. Each processing unit contained in the recognition dictionary generating unit 10 is also realized, for example, with the CPU 1 running a program stored in the memory 2. Below, these processing units will be described with focus being placed on things different from the first exemplary embodiment, and things same as the first exemplary embodiment will not be repeated.

The correcting unit 15 according to the second exemplary embodiment corrects the first reference vector and the second reference vector selected by the selection unit 13 with the following Equation 5. In the following Equation 5, X represents a learning input vector; $Y_1$ represents the above-described first reference vector; and $Y_2$ represents the above-described second reference vector. Further, in the following Equation 5, a term added to the first reference vector $Y_1$ corresponds to the first correction vector described above, and a term subtracted from the second reference vector $Y_2$ corresponding to the second correction vector described above.

[Formula 4]

$$\vec{Y}_1 \leftarrow \vec{Y}_1 + \alpha_1 f(D_1,D_2)\|\vec{X}-\vec{Y}_2\|^k(\vec{X}-\vec{Y}_1)$$

$$\vec{Y}_2 \leftarrow \vec{Y}_2 + \alpha_2 f(D_1,D_2)\|\vec{X}-\vec{Y}_1\|^k(\vec{X}-\vec{Y}_2)$$ Equation 5

In the above-described Equation 5, $D_1$ and $D_2$ represent a first distance value and a second distance value, respectively, each of which is acquired by the distance acquiring unit 14. k is a given real number more than one, and is used for obtaining a kth power of the Euclidean distance between vectors.

The $f(D_1, D_2)$ is a function (hereinafter, referred to as a first function) in which a value obtained from this function increase with the decrease in the difference between the first distance value $D_1$ and the second distance value $D_2$, or a function (hereinafter, referred to as a second function) in which the second distance value $D_2$ is smaller than the first distance value $D_1$, and a value obtained from this function increase with the increase in the difference between the first distance value $D_1$ and the second distance value $D_2$. $\alpha 1$ and $\alpha 2$ are parameters with a given positive real number. In the second exemplary embodiment, the value obtained by multiplying $\alpha 1$ by $f(D_1, D_2)$ and the value obtained by multiplying $\alpha 2$ by $f(D_1, D_2)$ correspond to coefficients that change according to the relationship between the first distance value and the second distance value.

With Equation 5, a vector obtained by subtracting the first reference vector $Y_1$ from the learning input vector X is multiplied by the coefficient and a value of kth power of the Euclidean distance between the learning input vector X and the second reference vector $Y_2$, thereby obtaining the first correction vector. Further, a vector obtained by subtracting the second reference vector $Y_2$ from the learning input vector X is multiplied by the coefficient and a value of kth power of the Euclidian distance between the learning input vector X and the first reference vector $Y_1$, thereby obtaining the second correction vector The correcting unit 15 adds up the first reference vector $Y_1$ and the first correction vector to correct the first reference vector $Y_1$, and subtracts the second correction vector from the second reference vector $Y_2$ to correct the second reference vector $Y_2$. As a result, the first reference vector $Y_1$ belonging to the class same as the learning input vector X is corrected into the direction approaching toward the learning input vector X, and the second reference vector $Y_2$ belonging to the class different from the learning input vector X is corrected into the direction spaced away from the learning input vector X.

Next, a predetermined function $f(D_1, D_2)$ will be described. For the function $f(D_1, D_2)$, any one of the two functions as described above is employed. In the case where the first distance value $D_1$ and the second distance value $D_2$ are close to each other, the learning input vector X exists near the classifying boundary. In many cases, the input vectors that have a high probability of being incorrectly recognized are located near the classifying boundary, and hence, the amount of correction of the reference vectors concerning the input vector X located near the classifying boundary is set so as to be larger than the amount of correction of the reference vectors concerning the input vector X located far from the classifying boundary, as in the first function.

In the case where the first function is employed, the function $f(D_1, D_2)$ can be expressed, for example, as the following Equation 6 and Equation 7. b is a given positive real number, and m is a value obtained by subtracting the second distance value $D_2$ from the first distance value $D_1$.

[Formula 5]

$$f(D_1, D_2) = g(m)(1 - g(m)) \quad \text{Equation 6}$$

$$g(m) = \frac{1}{1 + \exp(-b \times m)} \quad \text{Equation 7}$$

In the case where the learning input vector X is correctly classified, the first distance value $D_1$ is smaller than the second distance value $D_2$. On the other hand, in the case where the learning input vector X is incorrectly classified, the first distance value $D_1$ is larger than the second distance value $D_2$. In other words, when the second distance value $D_2$ is smaller than the first distance value $D_1$, the incorrect classification is more likely to occur with the increase in the difference between the first distance value $D_1$ and the second distance value $D_2$. Thus, when the second distance value $D_2$ is smaller than the first distance value $D_1$, the amount of correction is set to be larger with the increase in the difference between the first distance value $D_1$ and the second distance value $D_2$, as in the second function.

In the case where the second function is employed, the function $f(D_1, D_2)$ can be expressed, for example, as the following Equation 8 and Equation 9. b and m are similar to those in Equation 6 and Equation 7 above.

[Formula 6]

$$f(D_1, D_1) = bg(m) \quad \text{Equation 8}$$

$$g(m) = \exp(b \times m) \quad \text{Equation 9}$$

As described above, by using any one of the first function and the second function described above as the predetermined function $f(D_1, D_2)$ contained in the coefficient, it is possible to correct the reference vectors so as to reduce the incorrect classification.

With the correction of the reference vectors, correction is made such that the absolute value of the offset value attached to each of the reference vectors is set smaller for the reference vectors belonging to the class same as the learning input vector whereas that attached to each of the reference vectors is set larger for the reference vectors belonging the class different from the learning input vector. The amount of correction is set so as to increase with the decrease in the distance of the learning input vector from the classifying boundary, or increase as the incorrect recognition is more likely to occur.

The determining unit 16 receives the reference vectors corrected by the correcting unit 15 as described above, and determines reference vectors having the offset value not less than a predetermined threshold value (one, for example) to be reference vectors to be excluded from the recognition dictionary 20. The determining unit 16 stores reference vectors having the offset value less than a predetermined threshold value (one, for example) as the recognition dictionary 20.

It should be noted that the determining unit 16 may determine the reference vectors to be stored as the recognition dictionary 20 through another method. For example, the determining unit 16 may store, as the recognition dictionary 20, reference vectors having the absolute value of the offset value smaller than a constant factor of the minimum value of the absolute values of all the offset values, or may select the desired number of reference vectors such that the absolute values of the offset values of the reference vectors are arranged in increasing order from the smallest absolute value of the offset value, and are selected upwards from the smallest absolute value of the offset values, thereby storing them as the recognition dictionary 20.

Figure 6:
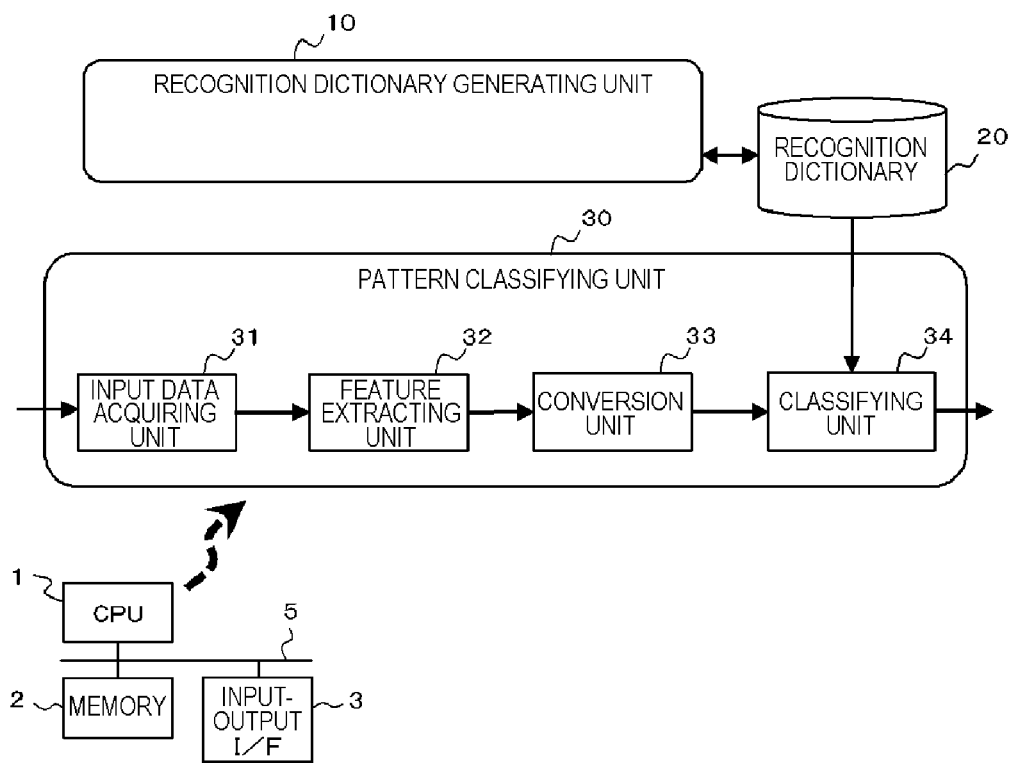
FIG. 6 is a schematic view illustrating an example of a configuration of a pattern classifying unit.

FIG. 6 is a schematic view illustrating an example of a configuration of the pattern classifying unit 30. The pattern classifying unit 30 includes, for example, an input data acquiring unit 31, a feature extracting unit 32, a conversion unit 33, and a classifying unit 34. Each processing unit contained in the pattern classifying unit 30 is realized, for example, with the CPU 1 running a program stored in the memory 2.

The input data acquiring unit 31 acquires input data to be classified. The input data includes, for example, image data, and audio data. This exemplary embodiment does not limit the input data itself.

The feature extracting unit 32 extracts feature information (feature value) from the input data acquired by the input data acquiring unit 31, and generates a d-dimensional feature vector (d is an integer not less than 1) including the feature value as one of elements thereof. Note that, in this exemplary embodiment, also one-dimensional data is denoted as a vector. For example, the feature extracting unit 32 converts an image data serving as the input data into a black-white and gray-scaled image, then divides the entire image into areas with 10 pieces in the vertical direction and 10 pieces in the horizontal direction, obtains the average brightness value for each of the areas in the image, thereby obtaining a 100-dimensional feature vector.

The conversion unit 33 adds an additional element (0) to the d-dimensional feature vector generated by the feature extracting unit 32, thereby converting this feature vector into a (d+1)-dimensional input vector.

The classifying unit 34 classifies the (d+1)-dimensional input vector converted by the conversion unit 33 by using plural (d+1)-dimensional reference vectors stored in the recognition dictionary 20 generated (learned) by the above-described recognition dictionary generating unit 10. The classifying function used by the classifying unit 34 is indicated by the above-described Equation 4. The classifying unit 34 acquires, as the classifying results, information on the class to which the (d+1)-dimensional input vector belongs, and outputs the acquired information on the class.

The acquiring unit 12 of the recognition dictionary generating unit 10 may acquire the (d+1)-dimensional learning input vector from the conversion unit 33 of the pattern classifying unit 30. In this case, in the pattern classifying unit 30, the input data acquiring unit 31 acquires the input data for learning; the feature extracting unit 32 generates a d-dimensional learning feature vector on the basis of this learning input data; and the conversion unit 33 converts the d-dimensional learning feature vector into the (d+1)-dimensional learning input vector. Further, the recognition dictionary generating unit 10 may include processing units similar to the input data acquiring unit 31, the feature extracting unit 32 and the conversion unit 33 of the pattern classifying unit 30 in order to generate the (d+1)-dimensional learning input vector.

Example of Operation

Figure 7:
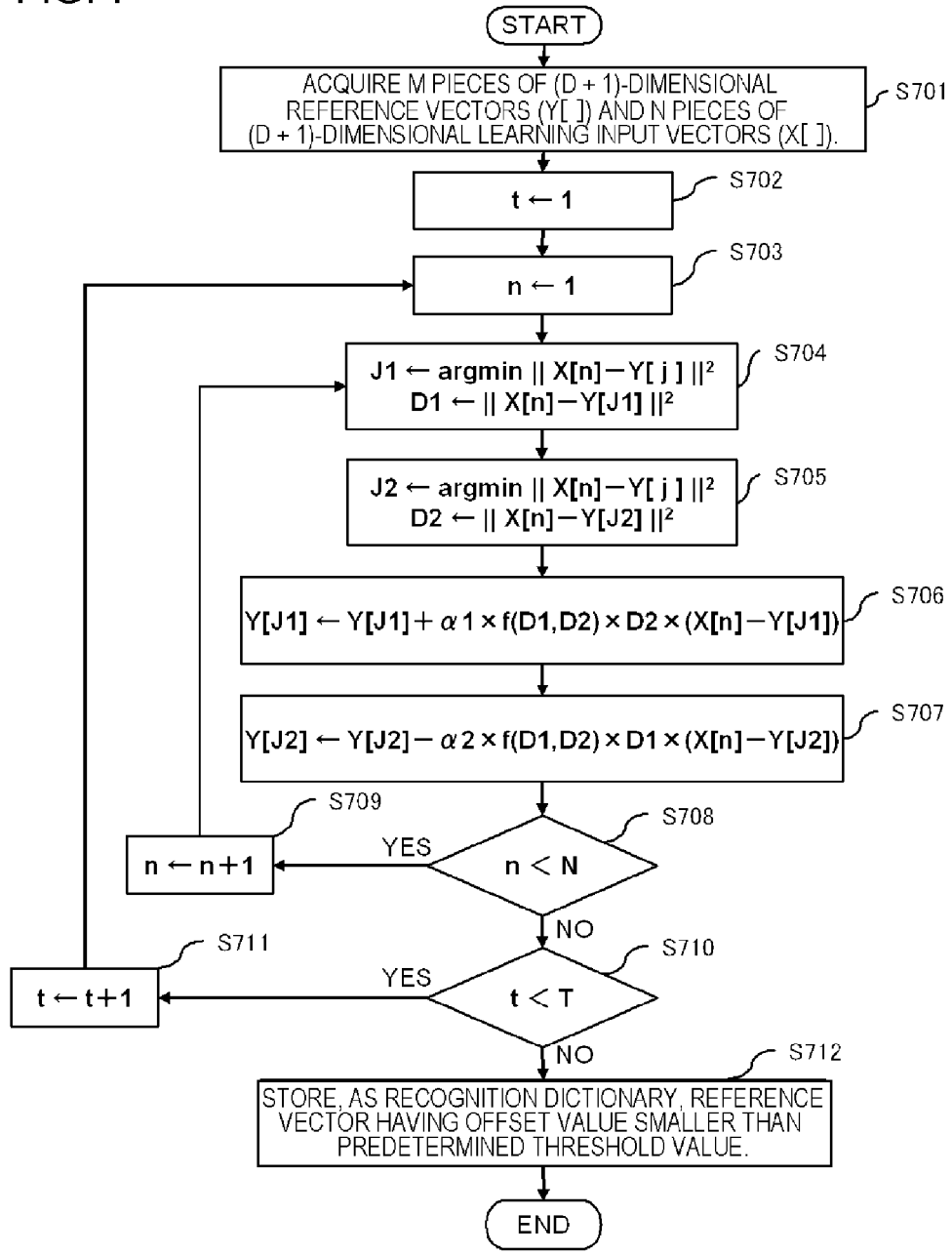
FIG. 7 is a flowchart showing a specific example of a generating process for a recognition dictionary in the second exemplary embodiment.

Below, an example of an operation performed by the pattern recognition device 7 according to the second exemplary embodiment will be described. FIG. 7 is a flowchart showing a specific example of a process of generating the recognition dictionary in the second exemplary embodiment. In the process of generating the recognition dictionary 20, the recognition dictionary generating unit 10 operates in the following manners.

The acquiring unit 12 acquires M pieces of (d+1)-dimensional reference vectors and N pieces of (d+1)-dimensional learning input vectors (S701). Each of the (d+1)-dimensional reference vectors has d pieces of feature values and one offset value ($\sigma$). The (d+1)-dimensional learning input vectors are generated by adding an additional element (0) to a d-dimensional feature vector obtained by extracting feature information from learning input data prepared in advance.

Here, one class is assigned in advance to each of the learning input vectors and each of the reference vectors. For example, in the case where N pieces of arrays CX[ ] are prepared and nth learning input vector belongs to a class k, CX[n]=k is set. Similarly, in the case where M pieces of arrays CY[ ] are prepared and jth reference vector belongs to a class k, CY[j]=k is set.

The initial value of the feature value of each of the reference vectors is set for each of the classes through a clustering method such as a K-means clustering. The offset value ($\sigma$) of each of the reference vectors is set, for example, to one. Here, N pieces of learning input vectors are denoted as (X[1], X[2], . . . , X[N]), and M pieces of reference vectors are denoted as (Y[1], Y[2], . . . , Y[M]).

The acquiring unit 12 may acquire N pieces of learning input data prepared in advance, and generate (d+1)-dimensional learning input vector on the basis of the acquired learning input data. Further, the acquiring unit 12 may acquire a (d+1)-dimensional learning input vector converted from the learning input data with each of the processing units (the input data acquiring unit 31, the feature extracting unit 32, and the conversion unit 33) of the pattern classifying unit 30.

The recognition dictionary generating unit 10 sets a variable t to 1 (initial value) (S702), and sets a variable n to 1 (initial value) (S703).

The selection unit 13 calculates values of squared Euclidean distances between the learning input vector X[n] and the reference vectors Y[j] belonging to the same class from among M pieces of reference vectors, and selects a reference vector Y[J1] having the smallest value of the calculated values. The distance acquiring unit 14 stores, in a variable $D_1$, a value of the squared Euclidean distance between the selected reference vector Y[J1] and the learning input vector X[n] (S704). In other words, in the example illustrated in FIG. 7, the squared Euclidean distance is used for the distance between vectors.

The selection unit 13 calculates values of squared Euclidean distances between the learning input vector X[n] and the reference vectors Y[j] belonging to the different class from among M pieces of reference vectors, and selects a reference vector Y[J2] having the smallest value of the calculated values. The distance acquiring unit 14 stores, in a variable $D_2$, a value of the squared Euclidean distance between the selected reference vector Y[J2] and the learning input vector X[n] (S705). Here, judging is made as to whether or not the class is the same as the learning input vector X[n], for example, by comparing the array CX[n] and the array CY[j].

The correcting unit 15 uses the above-described Equation 5 to correct the reference vectors Y[J1] and Y[J2] (S706 and S707). Here, for example, in Equation 5, k is set to two, and parameters $\alpha1$ and $\alpha2$ are set to 0.01. Note that this exemplary embodiment does not limit the values of k, $\alpha1$, and $\alpha2$ to those described above.

In the case where the variable n is smaller than the total amount N of the learning input vectors (S708; YES), the recognition dictionary generating unit 10 adds one to the variable n (S709). Then, the recognition dictionary generating unit 10 causes the selection unit 13 to perform the process S704 again.

On the other hand, in the case where the variable n is more than or equal to the total amount N of the learning input vector (S708; NO), the recognition dictionary generating unit 10 compares the variable t with the number T of times of learning, the number T being set in advance (S710). If the variable t is smaller than the number T of learning (S710; YES), the recognition dictionary generating unit 10 adds one to the variable t (S711). Then, the recognition dictionary generating unit 10 sets the variable n to one (initial value) (S703), and causes the selection unit 13 to perform S704 again.

In the case where the variable t is more than the number T of times of learning (S710; NO), the recognition dictionary generating unit 10 causes the determining unit 16 to perform processing. Of the corrected reference vectors (Y[1], Y[2], . . . , Y[M]), the determining unit 16 stores, as the recognition dictionary 20, a reference vector having the absolute value of the offset value smaller than a predetermined threshold value (for example, 1) (S712).

Figure 8:
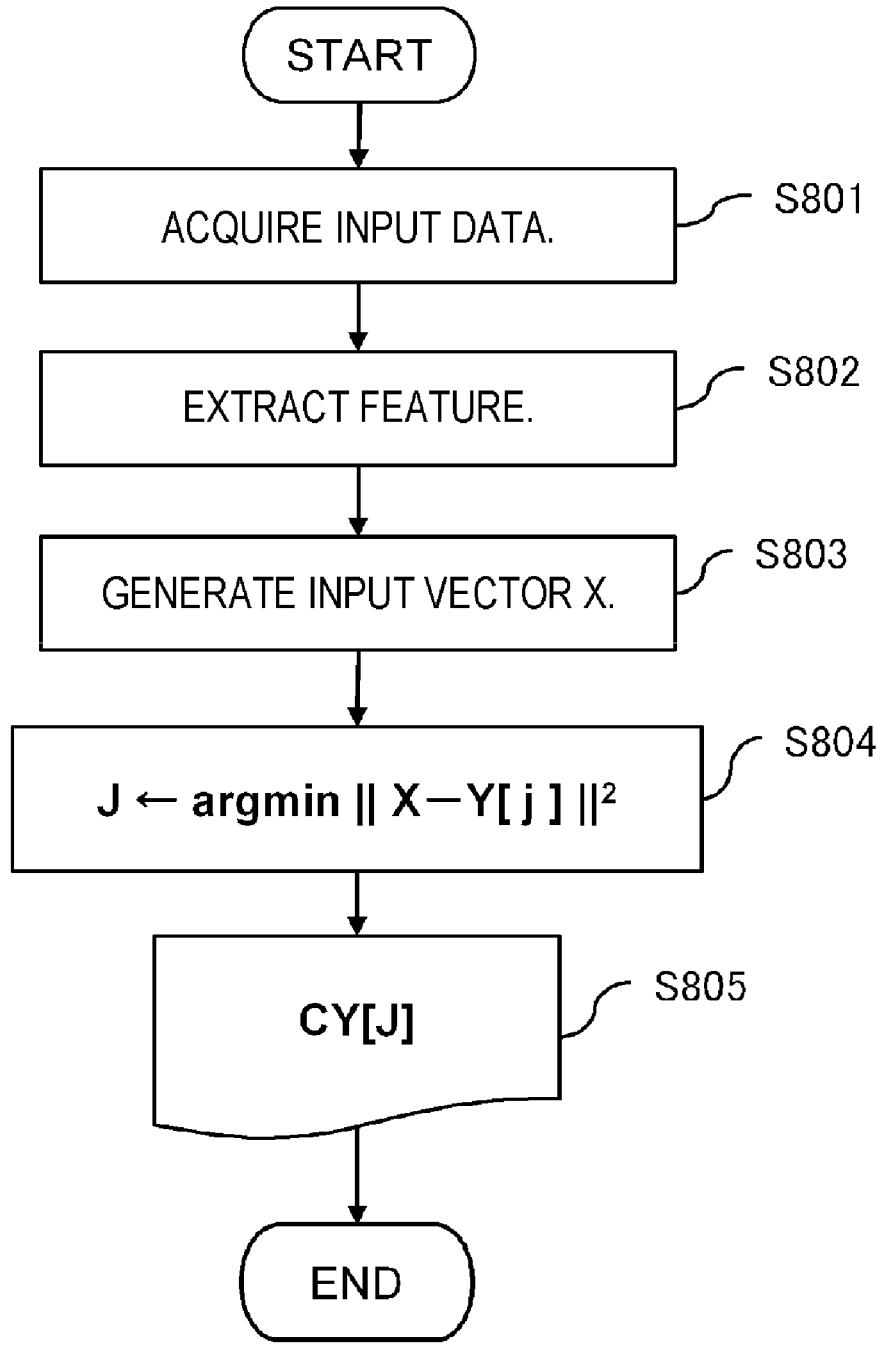
FIG. 8 is a flowchart showing a specific example of a pattern recognition process in the second exemplary embodiment.

FIG. 8 is a flowchart showing a specific example of a pattern recognition process in the second exemplary embodiment. In the pattern recognition process, the pattern classifying unit 30 operates in the following manners.

The input data acquiring unit 31 acquires input data (S801). The feature extracting unit 32 performs a predetermined feature extracting process to the acquired input data, thereby generating a d-dimensional feature vector (S802). The conversion unit 33 adds an additional element (0) to the d-dimensional feature vector, thereby generating a (d+1)-dimensional input vector X (S803).

The classifying unit 34 acquires the (d+1)-dimensional input vector X from the conversion unit 33, and acquires a reference vector Y[j] from the recognition dictionary 20. The classifying unit 34 calculates values of the squared Euclidean distance between the input vector X and the reference vectors Y[j], and selects a reference vector Y[J] having the smallest calculated value (S804).

The classifying unit 34 outputs, as the recognition result, a class CY[J] to which the selected reference vector Y[J] belongs (S805). Note that, in the case where plural pieces of input data are acquired, the processes S802 to S805 are repeated as many times as the number of pieces of input data acquired.

Operation and Effect of Second Exemplary Embodiment

As described above, in the second exemplary embodiment, in the process of generating the recognition dictionary, the reference vectors are corrected with the above-described Equation 5. With the learning of the reference vectors, correction is made such that the absolute value of the offset value attached to each of the reference vectors is set smaller for the reference vectors belonging to the class same as the learning input vector whereas that attached to each of the reference vectors is set larger for the reference vectors belonging to the class different from the learning input vector. As a result, the reference vectors having the absolute value of the offset value more than or equal to a predetermined threshold value are excluded as being interpreted as redundant data that do not have any effect on the classifying boundary, and only the important reference vectors that have an effect on the classifying boundary are stored as the recognition dictionary 20.

At the time of pattern recognition, the feature vector obtained on the basis of the input data is converted into an input vector so as to match the dimension of the reference vector containing the offset value, and the input data is recognized on the basis of the relationship between the input vector and the reference vector obtained from the recognition dictionary 20 in which the redundant reference vectors are excluded.

Thus, according to the second exemplary embodiment, by adding the offset value to each of the reference vectors, it is possible to automatically obtain the degree of importance of each of the reference vectors while determining the redundant reference vectors in an appropriate and easy manner. Thus, by excluding the redundant reference vector from the recognition dictionary, it is possible to increase the speed of the pattern recognition process without deteriorating the recognition accuracy.

Third Exemplary Embodiment

In the process of generating the recognition dictionary in the above-described second exemplary embodiment, all the elements of the reference vectors containing the offset value are corrected with Equation 5. However, it may be possible to correct only the offset value. Below, a third exemplary embodiment will be described in which, in the process of generating the recognition dictionary, only the offset value of each of the reference vectors is corrected.

The pattern recognition device 7 according to the third exemplary embodiment has a configuration similar to that in the second exemplary embodiment. However, only the process performed by the correcting unit 15 of the recognition dictionary generating unit 10 is different from that in the second exemplary embodiment. Below, the configuration of the pattern recognition device 7 in the third exemplary embodiment will be described with focus being placed on things different from the second exemplary embodiment.

In the third exemplary embodiment, the correcting unit 15 corrects each of the offset values of the first reference vector and the second reference vector selected by the selection unit 13 with the following Equation 10. In the following Equation 10, $\sigma_1$ indicates the offset value of the first reference vector $Y_1$, and $\sigma_2$ indicates the offset value of the second reference vector $Y_2$. k is a given real number more than one, and is a value for obtaining the kth power of the absolute value of the offset value ($\sigma_1$ or $\sigma_2$). The function $f(D_1, D_2)$, the parameters $\alpha_1$ and $\alpha_2$, and k are similar to the above-described Equation 5 in the second exemplary embodiment.

[Formula 7]

$$\sigma_1 \leftarrow \theta_1 - \alpha_1 f(D_1, D_2)|\sigma_2|^k \sigma_1$$

$$\sigma_2 \leftarrow \sigma_2 + \alpha_2 f(D_1, D_2)|\sigma_1|^k \sigma_2 \qquad \text{Equation 10}$$

The above-described Equation 10 is an equation in which calculation elements concerning the (d+1)th element (offset value and additional element (0)) are taken from the above-described Equation 5. Thus, by correcting the offset value using Equation 10 above, the offset value is corrected so as to indicate the degree of importance of the reference vector as in the second exemplary embodiment.

More specifically, the offset value of each of the reference vectors is corrected so as to be reduced for the offset values of the reference vectors belonging to the class same as the learning input vector and to be increased for the offset values of the reference vectors belonging to the class different from that of the learning input vector. The amount of correction is set so as to increase with the decrease in the distance of the corresponding learning input vector from the classifying boundary, or increase as the incorrect recognition is more likely to occur.

Example of Operation

Figure 9:
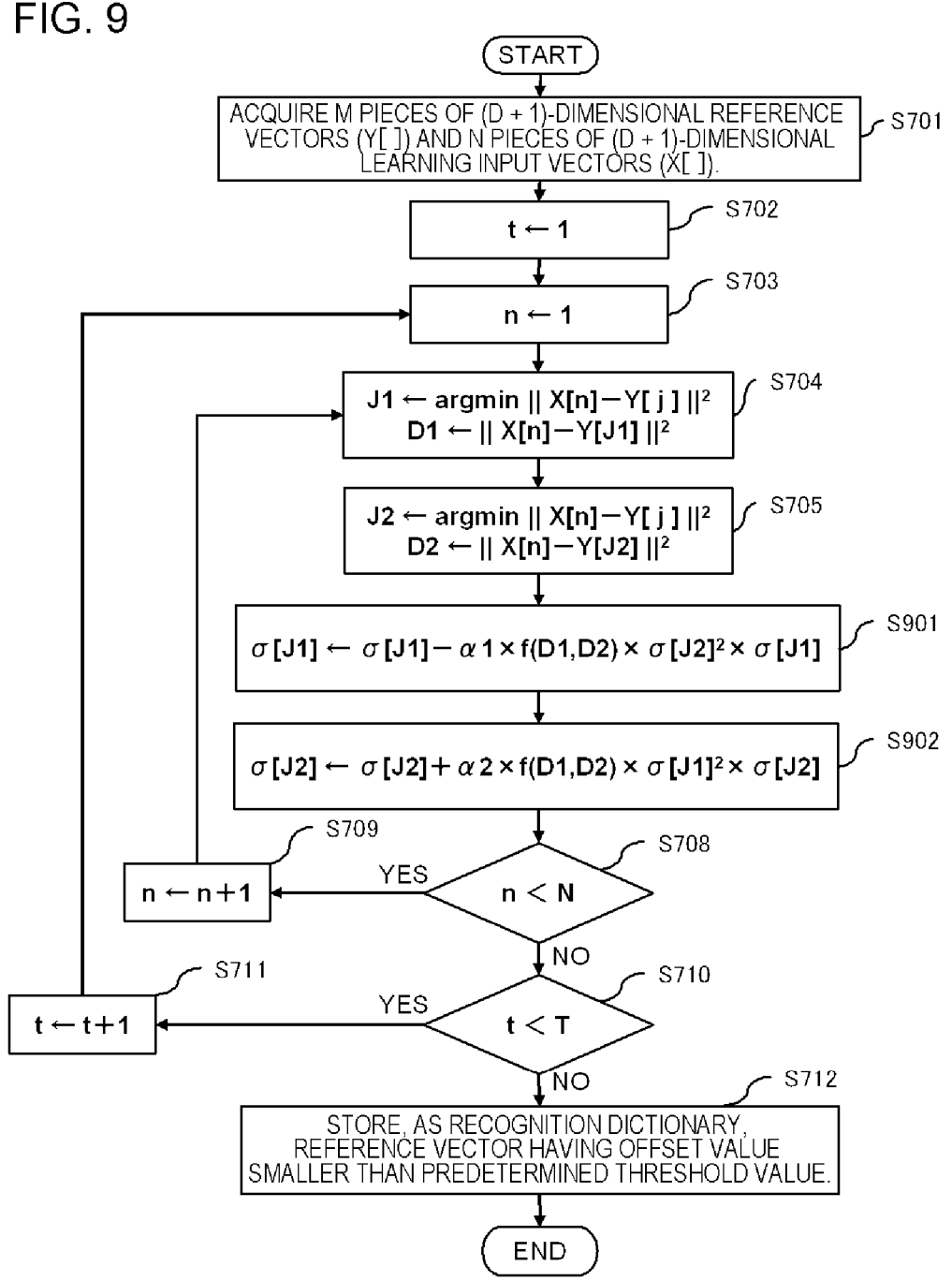
FIG. 9 is a flowchart showing a specific example of a generating process for a recognition dictionary in a third exemplary embodiment.

Below, an example of an operation performed by the pattern recognition device 7 according to the third exemplary embodiment. FIG. 9 is a flowchart showing a specific example of the process of generating the recognition dictionary according to the third exemplary embodiment. Note that the pattern recognition process is similar to that in the second exemplary embodiment, and hence, explanation thereof will not be repeated here.

Processes other than the process S901 and the process S902 are similar to those in the second exemplary embodiment, and hence, explanation thereof will not be repeated here.

The correcting unit 15 uses Equation 10 described above to correct an offset value $\sigma$[J1] of a reference vector Y[J1] and an offset value $\sigma$[J2] of a reference vector Y[J2] (S901 and S902). Here, for example, k in Equation 10 is set to 2, and parameters $\alpha1$ and $\alpha2$ are set to 0.01. Note that this exemplary embodiment does not limit values of k, $\alpha1$, and $\alpha2$ to those descried above. The offset value $\sigma$[j] (j is an integer ranging from one to M) is an array indicating the (d+1)th element value of the reference vector Y[j].

Operation and Effect of Third Exemplary Embodiment

In the third exemplary embodiment, in the process of generating the recognition dictionary 20, only the offset value of each of the reference vectors is corrected so as to indicate the degree of importance of the reference vector. Thus, according to the third exemplary embodiment, it is possible to obtain an effect similar to the second exemplary embodiment, and the amount of calculation between the vectors is reduced, so that the load of processing can be reduced.

It should be noted that the exemplary embodiments have been described with reference to plural flowcharts, and plural steps (processes) are described in a sequential order. However, the order of the description of the steps does not necessarily limit the order of the process steps performed in the exemplary embodiments. In the exemplary embodiments, the order of the process steps illustrated in the drawings may be exchanged, provided that the modification does not impair the details of the processes. The above-described exemplary embodiments may be combined, provided that the details thereof do not contradict each other.

The present application claims priority based on Japanese Patent Application No. 2011-002728 filed in Japan on Jan. 11, 2011, the disclosures of which are incorporated herein by reference in their entirety.

What is claimed is:

1. A recognition dictionary generating device that generates a recognition dictionary formed by plural reference vectors, comprising:
    an acquiring unit that acquires a plurality of (d+1)-dimensional reference vectors (d is an integer not less than 1) each containing d pieces of feature values and an offset value indicating a degree of importance of each of the reference vectors, and a (d+1)-dimensional learning input vector;
    a selection unit that, from among the plurality of reference vectors acquired by the acquiring unit, selects a first reference vector belonging to a class same as the learning input vector and having a minimum distance from the learning input vector, and a second reference vector belonging to a class different from the learning input vector and having a minimum distance from the learning input vector;
    a distance acquiring unit that acquires a first distance value indicating a distance between the learning input vector and the first reference vector, and a second distance value indicating a distance between the learning input vector and the second reference vector;
    a correcting unit that corrects the first reference vector using a first correction vector obtained by multiplying a coefficient changing in accordance with a relationship between the first distance value and the second distance value, by a value obtained by exponentiation of the second distance value, and by a difference between the learning input vector and the first reference vector, and corrects the second reference vector using a second correction vector obtained by multiplying the coefficient, by a value obtained by exponentiation of the first distance value, and by a difference between the learning input vector and the second reference vector; and
    a determining unit that determines a reference vector to be excluded from the recognition dictionary in accordance with an offset value of each of the first reference vector and the second reference vector, each of which has been corrected by the correcting unit.

2. The recognition dictionary generating device according to claim 1, wherein
    the coefficient increases with a decrease in a difference between the first distance value and the second distance value, or, in a case where the second distance value is smaller than the first distance value, increases with an increase in a difference between the first distance value and the second distance value.

3. The recognition dictionary generating device according to claim 1, wherein
    the correcting unit corrects only the offset value of the first reference vector by using a value obtained by multiplying the coefficient, by a value obtained by exponentiation of an absolute value of the offset value of the second reference vector, and by the offset value of the first reference vector, and corrects only the offset value of the second reference vector by using a value obtained by multiplying the coefficient, by a value obtained by exponentiation of an absolute value of the offset value of the first reference vector, and by the offset value of the second reference vector.

4. A pattern recognition device comprising:
    the recognition dictionary generating device according to claim 1;
    a first conversion unit that converts a feature vector containing d pieces of feature values acquired from input data, into a (d+1)-dimensional input vector;
    a recognition dictionary that is formed by the plurality of (d+1)-dimensional reference vectors except for the reference vector determined by the determining unit to be excluded from the recognition dictionary; and
    a classifying unit that classifies a class to which the input data belongs by using the plurality of reference vectors constituting the recognition dictionary and the input vector obtained through conversion by the first conversion unit.

5. A recognition dictionary generating method that generates a recognition dictionary formed by a plurality of reference vectors, and causes a computer to:
    acquire a plurality of (d+1)-dimensional reference vectors (d is an integer not less than 1) each containing d pieces of feature values and an offset value indicating a degree of importance of each of the reference vectors, and a (d+1)-dimensional learning input vector;
    select, from among the acquired plurality of reference vectors, a first reference vector belonging to a class same as the learning input vector and having a minimum distance from the learning input vector, and a second reference vector belonging to a class different from the learning input vector and having a minimum distance from the learning input vector;
    acquire a first distance value indicating a distance between the learning input vector and the first reference vector, and a second distance value indicating a distance between the learning input vector and the second reference vector;
    correct the first reference vector using a first correction vector obtained by multiplying a coefficient changing in accordance with a relationship between the first distance value and the second distance value, by a value obtained by exponentiation of the second distance value, and by a difference between the learning input vector and the first reference vector;
    correct the second reference vector using a second correction vector obtained by multiplying the coefficient, by a value obtained by exponentiation of the first distance value, and by a difference between the learning input vector and the second reference vector; and
    determine a reference vector to be excluded from the recognition dictionary in accordance with an offset value of the corrected first reference vector and an offset value of the corrected second reference vector.

6. The recognition dictionary generating method according to claim 5, wherein
    the coefficient increases with a decrease in a difference between the first distance value and the second distance value, or, in a case where the second distance value is smaller than the first distance value, increases with an increase in a difference between the first distance value and the second distance value.

7. The recognition dictionary generating method according to claim 5, wherein
said correcting the first reference vector corrects only the offset value of the first reference vector using a value obtained by multiplying the coefficient, by a value obtained by exponentiation of an absolute value of the offset value of the second reference vector, and by an offset value of the first reference vector, and
said correcting the second reference vector corrects only the offset value of the second reference vector using a value obtained by multiplying the coefficient, by a value obtained by exponentiation of an absolute value of the offset value of the first reference vector, and by the offset value of the second reference vector.

8. A non-transitory computer-readable storage medium storing a program that generates a recognition dictionary formed by a plurality of reference vectors and causes a computer to realize:
an acquiring unit that acquires a plurality of (d+1)-dimensional reference vectors (d is an integer not less than 1) each containing d pieces of feature values and an offset value indicating a degree of importance of each of the reference vectors, and a (d+1)-dimensional learning input vector;
a selection unit that, from among the plurality of reference vectors acquired by the acquiring unit, selects a first reference vector belonging to a class same as the learning input vector and having a minimum distance from the learning input vector, and a second reference vector belonging to a class different from the learning input vector and having a minimum distance from the learning input vector;
a distance acquiring unit that acquires a first distance value indicating a distance between the learning input vector and the first reference vector, and a second distance value indicating a distance between the learning input vector and the second reference vector;
a correcting unit that corrects the first reference vector using a first correction vector obtained by multiplying a coefficient changing in accordance with a relationship between the first distance value and the second distance value, by a value obtained by exponentiation of the second distance value, and by a difference between the learning input vector and the first reference vector, and corrects the second reference vector using a second correction vector obtained by multiplying the coefficient, by a value obtained by exponentiation of the first distance value, and by a difference between the learning input vector and the second reference vector; and
a determining unit that determines a reference vector to be excluded from the recognition dictionary in accordance with an offset value of each of the first reference vector and the second reference vector, each of which has been corrected by the correcting unit.

9. The non-transitory computer-readable storage medium storing the program according to claim 8, wherein
the coefficient increases with a decrease in a difference between the first distance value and the second distance value, or, in a case where the second distance value is smaller than the first distance value, increases with an increase in a difference between the first distance value and the second distance value.

10. The non-transitory computer-readable storage medium storing the program according to claim 8, wherein
the correcting unit corrects only the offset value of the first reference vector by using a value obtained by multiplying the coefficient, by a value obtained by exponentiation of an absolute value of the offset value of the second reference vector, and by the offset value of the first reference vector, and corrects only the offset value of the second reference vector by using a value obtained by multiplying the coefficient, by a value obtained by exponentiation of an absolute value of the offset value of the first reference vector, and by the offset value of the second reference vector.

\* \* \* \* \*